US012738876B2

(12) United States Patent
Nakamura et al.

(10) Patent No.: US 12,738,876 B2
(45) Date of Patent: Sep. 15, 2026

(54) VOLTAGE CONTROL DEVICE AND VOLTAGE CONTROL METHOD

(71) Applicant: KYOTO UNIVERSITY, Kyoto (JP)

(72) Inventors: Taketsune Nakamura, Kyoto (JP); Yoshitaka Goto, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 214 days.

(21) Appl. No.: 18/840,700

(22) PCT Filed: Feb. 14, 2023

(86) PCT No.: PCT/JP2023/005027
§ 371 (c)(1),
(2) Date: Aug. 22, 2024

(87) PCT Pub. No.: WO2023/162784
PCT Pub. Date: Aug. 31, 2023

(65) Prior Publication Data
US 2025/0183834 A1 Jun. 5, 2025

(30) Foreign Application Priority Data
Feb. 25, 2022 (JP) ................................ 2022-028054

(51) Int. Cl.
*H02P 27/08* (2006.01)
*H02P 29/50* (2016.01)

(52) U.S. Cl.
CPC .............. *H02P 27/08* (2013.01); *H02P 29/50* (2016.02)

(58) Field of Classification Search
CPC .. H02P 27/08; H02P 29/50; H02P 6/10; H02P 23/04; H02M 7/53871; H02M 7/53873; H02M 7/5395; H02M 1/12
USPC ......................... 318/811, 810, 807, 767, 727
See application file for complete search history.

(56) References Cited

U.S. PATENT DOCUMENTS 8,547,041 B2 * 10/2013 Furukawa ............... H02M 1/12 318/811

FOREIGN PATENT DOCUMENTS

JP 2004-337000 11/2004

OTHER PUBLICATIONS

International Search Report Issued in International Patent Application No. PCT/JP2023/005027, dated May 9, 2023, along with an English translation thereof.

* cited by examiner

*Primary Examiner* — David Luo
(74) *Attorney, Agent, or Firm* — GREENBLUM & BERNSTEIN, P.L.C.

(57) ABSTRACT

A voltage control device that controls an output voltage by turning on/off a switching element by a control pulse, the voltage control device including a modulation wave generation unit that generates a sinusoidal wave based on a driving voltage and a driving frequency as a modulation wave, an arithmetic unit that calculates, at any discrete time point [t], a moving average value of a voltage [v] output every time duration [δ] smaller than a time cycle of the modulation wave in a time period [t−Nδ to t−δ] tracing back N (a positive integer) steps from the discrete time point [t] in accordance with Expression (1) below, and a control pulse generation unit that generates the control pulse in accordance with a result of a comparison between the moving average value and an instantaneous value of the modulation wave at the discrete time point [t].

[Expression 1]

$$\sum_{i=1}^{N} \frac{v(t-i\delta)}{N} \quad (1)$$

12 Claims, 9 Drawing Sheets

[Figure 1]
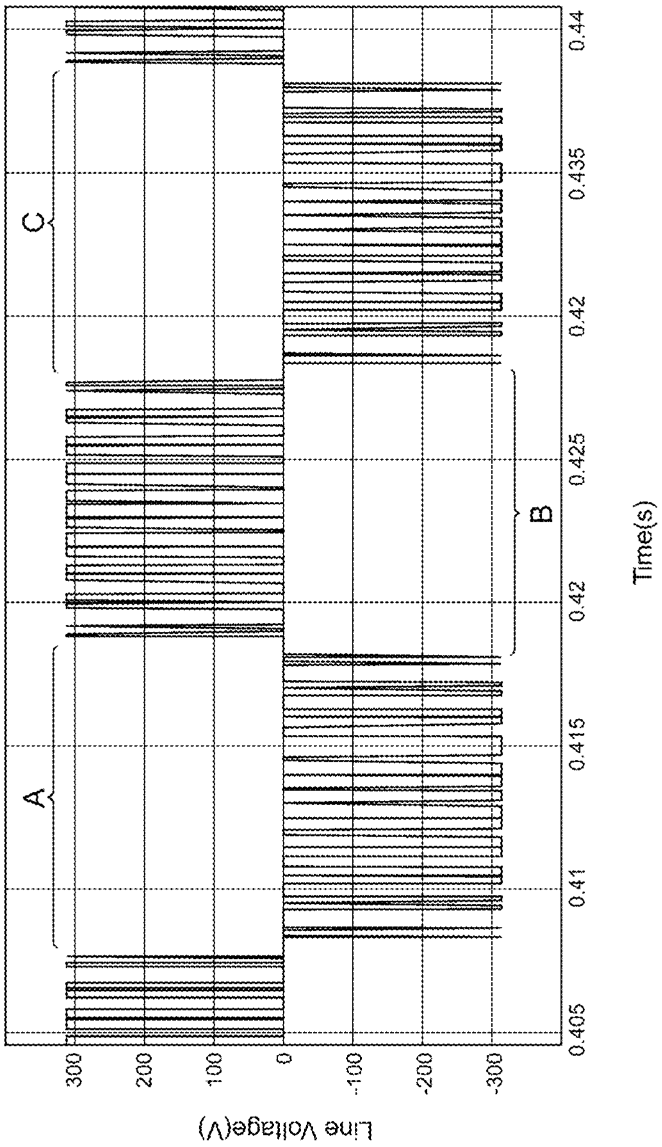

[Figure 2]
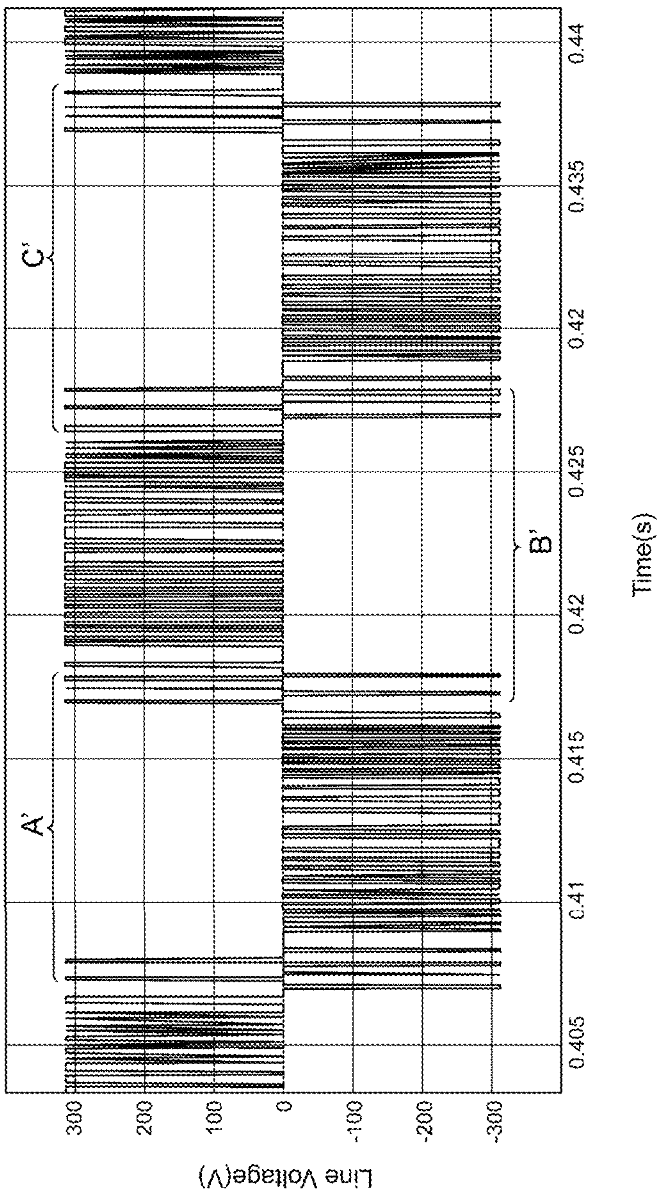

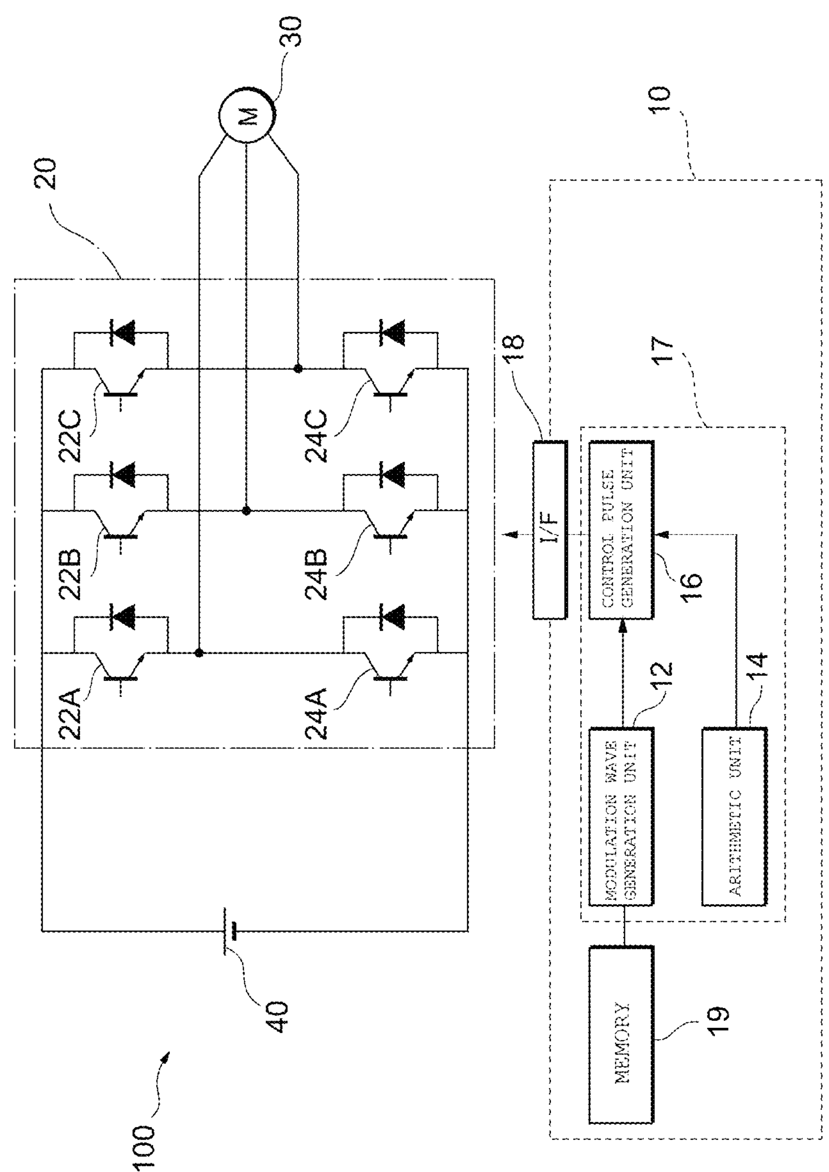
[Figure 3]
100
40
20
30
M
22A
22B
22C
24A
24B
24C
18
I/F
10
17
CONTROL PULSE GENERATION UNIT
16
MODULATION WAVE GENERATION UNIT
12
ARITHMETIC UNIT
14
MEMORY
19

[Figure 4]
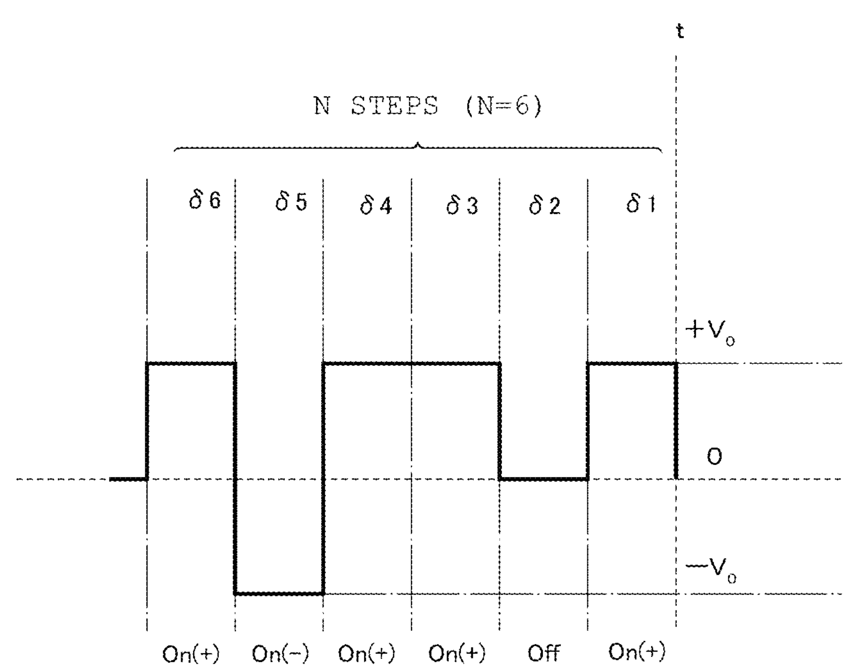

[Figure 5]
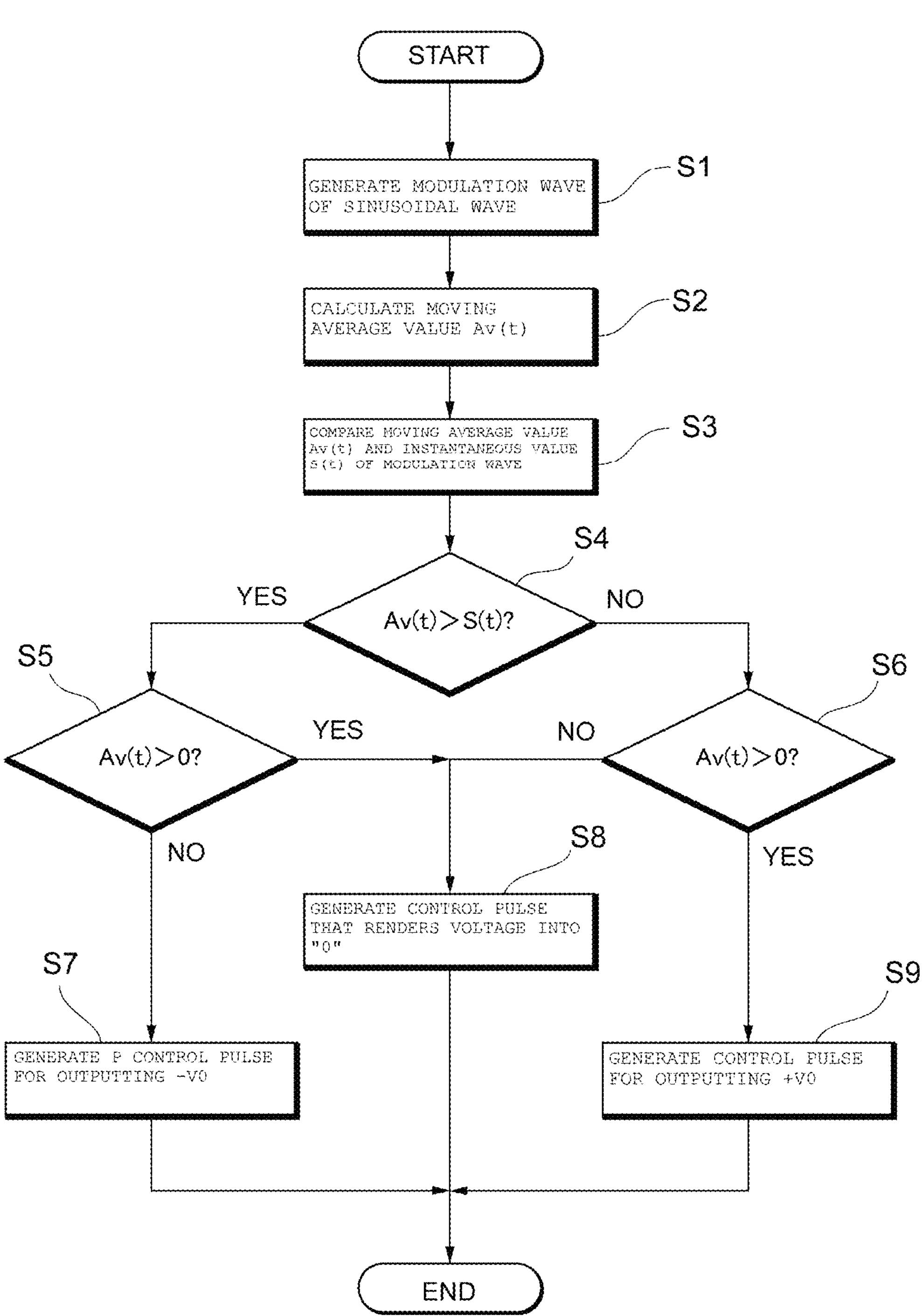

[Figure 6]
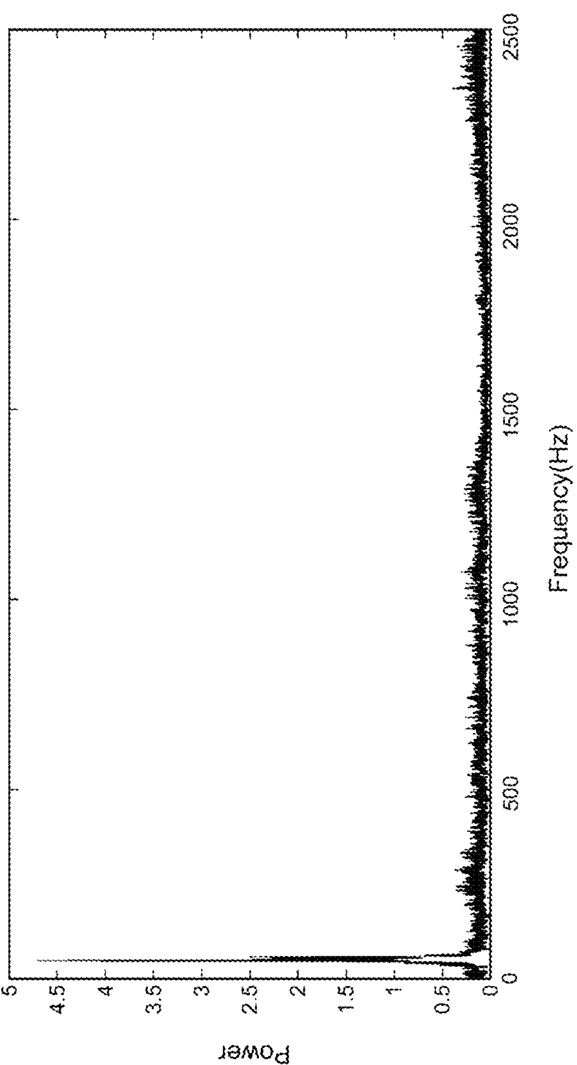

[Figure 7]
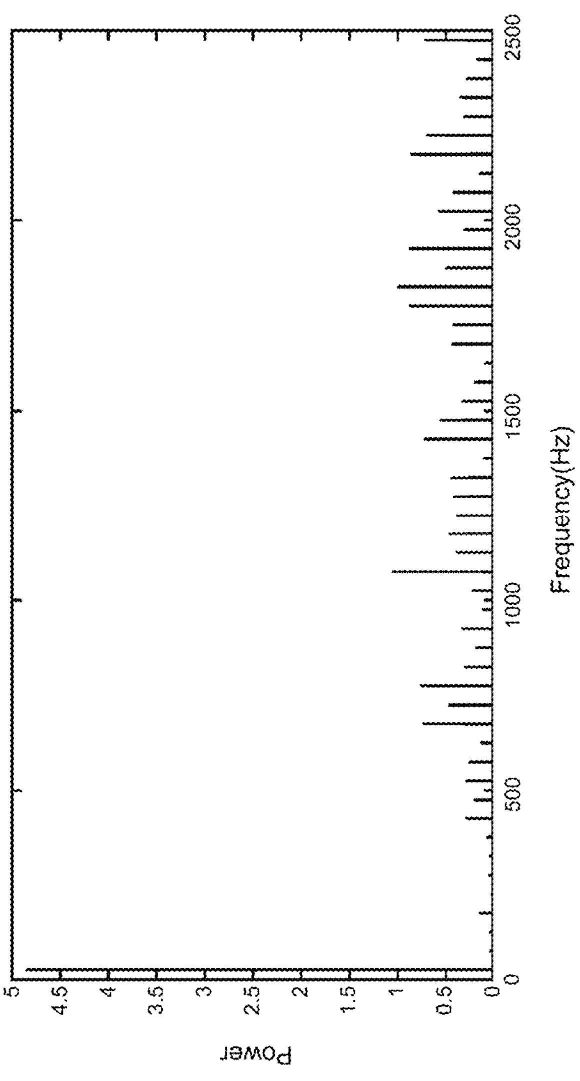

[Figure 8]
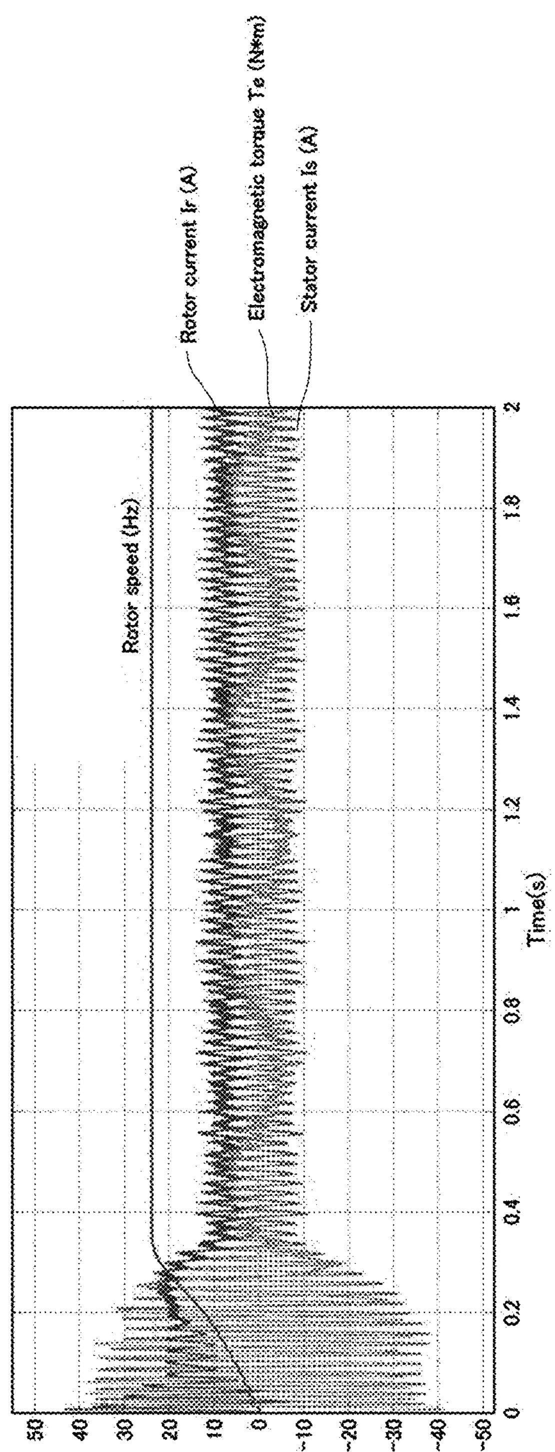

[Figure 9]
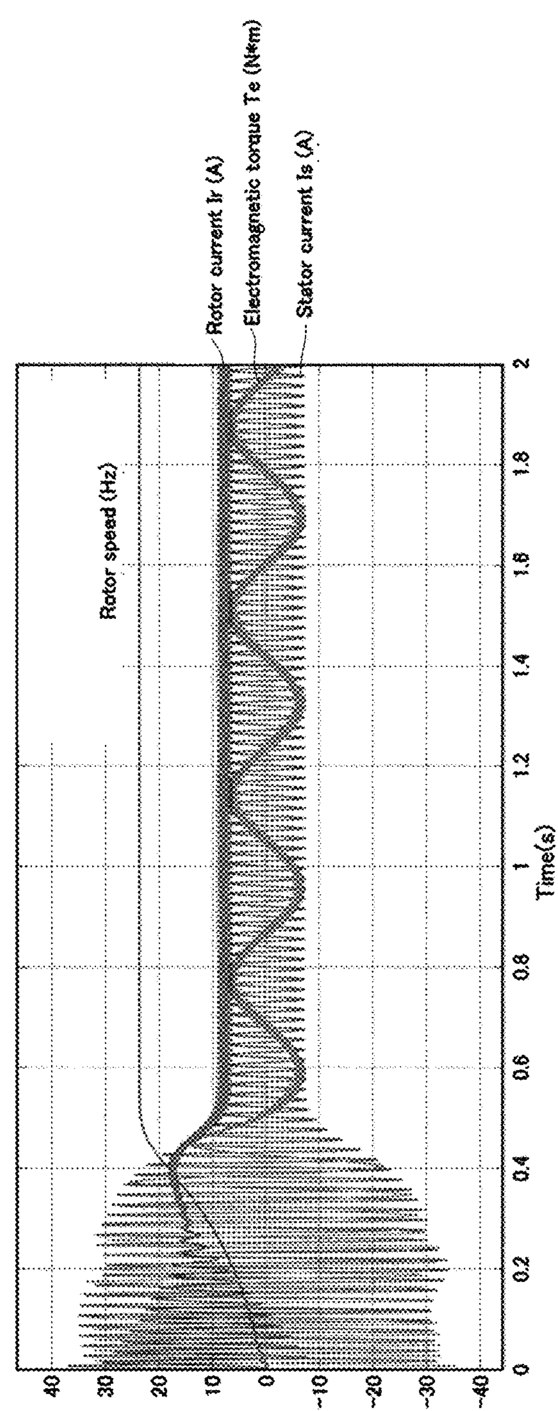

VOLTAGE CONTROL DEVICE AND VOLTAGE CONTROL METHOD

TECHNICAL FIELD

The present invention relates to a voltage control device and a voltage control method.

BACKGROUND ART

The rotating electric machine invented in the nineteenth century is industrial equipment indispensable for human activities nowadays. For example, annual power consumption in our country is approaching 1 trillion kWh, more than or equal to 55% of which is consumed by various motors. For achieving a low-carbon society in the future, it is also considered for transport equipment that motorization of not only railroads but also motor vehicles, buses, trucks, vessels, aircrafts, and the like will advance, that is, the rotating electric machine will play an increasingly important role. Therefore, even a 1% improvement in efficiency of the rotating electric machine will lead to an extremely great power saving effect thereof.

In order to achieve the power saving effect as described above, a highly-efficient driving control technology for the rotating electric machine is indispensable. In recent years, an inverter that produces an alternating-current voltage by a semiconductor switch from a direct-current voltage has generally been heavily used as the driving control technology for the rotating electric machine. A PWM (Pulse Width Modulation) method is used as a method for generating the voltage, and for example, a method for achieving an alternating-current voltage by a pulsed voltage waveform generated by triangular wave comparison (comparison between a triangular carrier and a sinusoidal modulation wave) is used for driving of the rotating electric machine such as a motor. Various technologies for adjusting the waveform of an output voltage of an inverter have been developed and, for example, a technology for driving an electric motor with three-phase alternating-current voltage output subjected to pulse width modulation using an instantaneous space vector method rather than a triangular wave, and the like have been developed for a PWM control voltage inverter that can reduce waveform distortion in an inverter output voltage (see, for example, Patent Literature 1 below).

CITATION LIST

Patent Literature

Patent Literature 1

Japanese Patent Laid-Open No. 2004-337000

SUMMARY OF INVENTION

Technical Problem

On the other hand, the PWM waveform is a method for obtaining a voltage waveform of a pseudo-sinusoidal wave, however, what bears electromechanical energy conversion in the rotating electric machine is a “magnetic flux” controlled temporally and spatially, and what gives torque is a current. Thus, even if the voltage waveform draws an ideal sine curve, a temporal harmonic of the PWM voltage waveform actually affects electromechanical energy conversion and torque production, which causes degradation in efficiency in the rotating electric machine, an increase in striking current, an occurrence of torque ripple, and the like. Thus, development of a method for generating a pulse such as a new PWM voltage waveform that reduces a striking current and torque ripple as compared with the widely-used triangular wave comparison PWM when controlling an alternating-current rotating electric machine is being expected.

In order to solve the above-described problems, the present invention has an object to provide a voltage control device and a voltage control method in which when the device is controlled using a magnetic flux produced by application of an alternating-current voltage, a magnetic flux amount in the device can be smoothed.

Solution to Problem

Inventors of the present invention have focused on the fact that an operation called a moving average of an output voltage evaluates an amount proportional to a “magnetic flux” in an alternating-current rotating electric machine or the like and have found out that a magnetic flux amount can be smoothed by subjecting oscillation of the magnetic flux amount in the alternating-current rotating electric machine to an averaging operation using a moving average of output voltages, thus yielding the present invention.

The present invention provides a voltage control device that controls an output voltage by turning on/off a switching element by a control pulse, the voltage control device including a modulation wave generation unit that generates a sinusoidal wave based on a driving voltage and a driving frequency as a modulation wave, an arithmetic unit that calculates, at any discrete time point [t], a moving average value of a voltage [v] output every time duration [δ] smaller than a time cycle of the modulation wave in a time period [t−Nδ to t−δ] tracing back N (a positive integer) steps from the discrete time point [t] in accordance with Expression (1) below, and a control pulse generation unit that generates the control pulse in accordance with a result of a comparison between the moving average value and an instantaneous value of the modulation wave at the discrete time point [t].

[Expression 1]

$$\sum_{i=1}^{N} \frac{v(t-i\delta)}{N} \tag{1}$$

According to the voltage control device of the present invention, the moving average value of the voltage [v] output every time duration [δ] and the instantaneous value of the modulation wave which is the sinusoidal wave can be compared, and on the basis of a result of the comparison, the output voltage can be controlled by turning on/off the switching element by the control pulse. As described, the use of the result of the comparison between the moving average value of the output voltage and the instantaneous value of the modulation wave which is the sinusoidal wave enables oscillation of a magnetic flux amount in an alternating-current rotating electric machine to be subjected to an averaging operation, so that the magnetic flux amount in the rotating electric machine can be smoothed.

Provided as an aspect of the present invention is the control pulse voltage control device in which the control pulse generation unit generates a control pulse of outputting 0 in a case where the moving average value is positive and larger than the instantaneous value of the modulation wave, a positive pulse voltage [$+V_0$] in a case where the moving average value is positive and smaller than the instantaneous value of the modulation wave, a negative pulse voltage [$-V_0$] in a case where the moving average value is negative and larger than the instantaneous value of the modulation wave, or a voltage of 0 in a case where the moving average value is negative and smaller than the instantaneous value of the modulation wave.

According to the present aspect, the control pulse generation unit can generate the control pulse of generating 0, the positive pulse voltage [$+V_0$], or the negative pulse voltage [$-V_0$] on the basis of the result of the comparison between the moving average value of the output voltage and the instantaneous value of the modulation wave. As described, by generating the control pulse on the basis of the comparison between the moving average value and the instantaneous value, turning on/off of the switching elements can be controlled so as to output a voltage by which the magnetic flux amount in the rotating electric machine can be smoothed.

The present invention provides a voltage control method for controlling an output voltage by turning on/off a switching element by a control pulse, including generating a sinusoidal wave based on a driving voltage and a driving frequency as a modulation wave, calculating, at any discrete time point [t], a moving average value of a voltage [v] output every time duration [δ] smaller than a time cycle of the modulation wave in a time period [t−Nδ to t−δ] tracing back N (a positive integer) steps from the discrete time point [t] in accordance with Expression (1) below, and generating the control pulse in accordance with a result of a comparison between the moving average value and an instantaneous value of the modulation wave at the discrete time point [t].

[Expression 2]

$$\sum_{i=1}^{N} \frac{v(t-i\delta)}{N} \tag{1}$$

According to the voltage control method of the present invention, the moving average value of the voltage [v] output every time duration [δ] and the instantaneous value of the modulation wave which is the sinusoidal wave can be compared, and on the basis of the result of the comparison, the output voltage can be controlled by turning on/off the switching element by the control pulse. As described, the use of the result of the comparison between the moving average value of the output voltage and the instantaneous value of the modulation wave which is the sinusoidal wave enables oscillation of the magnetic flux amount in the alternating-current rotating electric machine to be subjected to an averaging operation, so that the magnetic flux amount in the rotating electric machine can be smoothed.

Provided as an aspect of the present invention is the voltage control method including generating a control pulse of outputting 0 in a case where the moving average value is positive and larger than the instantaneous value of the modulation wave, a positive pulse voltage [$+V_0$] in a case where the moving average value is positive and smaller than the instantaneous value of the modulation wave, a negative pulse voltage [$-V_0$] in a case where the moving average value is negative and larger than the instantaneous value of the modulation wave, or a voltage of 0 in a case where the moving average value is negative and smaller than the instantaneous value of the modulation wave.

According to the present aspect, the control pulse generation unit can generate the control pulse of generating 0, the positive pulse voltage [$+V_0$], or the negative pulse voltage [$-V_0$] on the basis of the result of the comparison between the moving average value of the output voltage and the instantaneous value of the modulation wave. As described, by generating the control pulse on the basis of the comparison between the moving average value and the instantaneous value, turning on/off of the switching element can be controlled so as to output a voltage by which the magnetic flux amount in the rotating electric machine can be smoothed.

Also provided as an aspect of the present invention is a rotating electric machine, a vessel, a motor vehicle, or an aircraft including the above-described voltage control device. According to the present aspect, a rotating electric machine, a vessel, a motor vehicle, or an aircraft excellent in energy efficiency can be manufactured by using the voltage control device or the voltage control method described above.

Advantageous Effects of Invention

According to the present invention, it is possible to provide a voltage control device and a voltage control method in which when the device is controlled using a magnetic flux produced by application of an alternating-current voltage, a magnetic flux amount in the device can be smoothed.

BRIEF DESCRIPTION OF DRAWINGS

FIG. 1 is a schematic diagram showing a line voltage waveform in a conventional PWM method.

FIG. 2 is a schematic diagram showing a line voltage waveform in a voltage control device of the present embodiment.

FIG. 3 is a diagram showing an example of an overall configuration including the voltage control device according to the present embodiment.

FIG. 4 is an outline diagram for describing a moving average value Av(t) in the present embodiment.

FIG. 5 is a flowchart showing a flow of a voltage control method of the present embodiment.

FIG. 6 is a frequency spectrum analysis diagram of a line voltage waveform during driving in the conventional PWM method (a pseudo-sinusoidal wave output method: 1 kHz carrier).

FIG. 7 is a frequency spectrum analysis diagram of a line voltage waveform during driving in a moving average method in the present embodiment.

FIG. 8 is a graph showing a simulation result of motor properties during driving in the conventional PWM method (the pseudo-sinusoidal wave output method: 1 kHz carrier).

FIG. 9 is a graph showing a simulation result of motor properties during driving in the moving average method in the present embodiment.

DESCRIPTION OF EMBODIMENT

Hereinafter, a voltage control device and a voltage control method of the present embodiment will be described as appropriate with reference to the drawings. However, the present invention is not limited to the following embodiment. In the following description, the same or corresponding members are denoted by the same reference numerals, and description thereof is omitted in some cases. Note that in the present specification, an alternating-current voltage to be applied to a rotating electric machine is a multi-phase alternating-current voltage (for example, a three-phase alternating-current voltage) unless specifically limited, and a voltage to be applied to the rotating electric machine means a "line voltage" unless specifically limited.

The voltage control device and the voltage control method of the present embodiment (which hereinafter will be referred to as "the voltage control device and the like of the present embodiment" together in some cases) can be suitably used for a device that uses a magnetic flux produced by application of an alternating-current voltage, such as a rotating electric machine that utilizes a magnetic flux produced by application of an applied voltage. The voltage control device and the like of the present embodiment are applicable as a PWM inverter that controls turning on/off of a switching element by a control pulse and controls a voltage to be output, and the like. However, the control pulse formed by the voltage control device and the like of the present embodiment is not limited to a PWM pulse.

The voltage control device and the like of the present embodiment compare a moving average value of a predetermined voltage [v] and an instantaneous value of a modulation wave which is a sinusoidal wave every time duration [δ] (such as, for example, δ=0.1 msec for a driving frequency (50 Hz)) sufficiently smaller than a time cycle of the modulation wave and on the basis of a result of the comparison, control the output voltage by turning on/off the switching element by the control pulse. Physically interpreting the voltage control device and the like of the present embodiment, first, an operation called the moving average of the voltage [v] output every time duration [δ] leads to evaluation of an amount proportional to a "magnetic flux" in a rotating electric machine such as a motor to which a voltage is applied. The voltage control device and the like of the present embodiment are a method for generating a pulse pattern using the moving average of the voltage, and the method for controlling the output voltage using the moving average value of the voltage [v] will hereinafter be referred to as a "moving average method" in some cases.

In more detail, electromechanical energy conversion in the rotating electric machine or the like is achieved directly by control over the magnetic flux rather than over the voltage. In other words, although the voltage is necessary for achieving the magnetic flux in the rotating electric machine or the like, electromechanical energy conversion in the rotating electric machine or the like does not occur directly by the voltage. Thus, in the voltage control device or the like to be used for the rotating electric machine or the like, it is more important to render a spatial distribution of the magnetic flux into a sinusoidal wave with few harmonic components than to render the waveform of the voltage into a sinusoidal wave with few harmonic components.

For example, a line voltage waveform (1 kHz carrier) in a conventional PWM method obtained in a simulation result in a case of driving under conditions which will be described later is shown in FIG. 1. As shown in FIG. 1, in the conventional PWM method, the waveform of the line voltage is controlled to be a sinusoidal wave with few harmonic components by adjusting a duty ratio. Thus, in the conventional PWM method, the voltage is output in accordance with the waveform of the sinusoidal wave, and there is no application of positive and negative opposite voltages in any of regions A, B, and C, for example.

In contrast, a line voltage waveform in the voltage control device and the like of the present embodiment obtained in a simulation result in a case of driving under the conditions which will be described later is shown in FIG. 2. In the voltage control device and the like of the present embodiment, a voltage to be output is controlled by the moving average method, and as shown in FIG. 2, it cannot be said that the waveform of the line voltage is a sinusoidal wave with few harmonic components. In FIG. 2, for example, there are regions which do not follow the sinusoidal wave and in which positive and negative voltages are mixed like regions A', B', and C'. As described, the voltage to be output does not become a sinusoidal wave with few harmonic components in the voltage control device and the like of the present embodiment, however, the spatial distribution of the magnetic flux in the rotating electric machine or the like is rendered into a sinusoidal wave with few harmonic components by the moving average method.

The fact that the spatial distribution of the magnetic flux in the rotating electric machine or the like can be rendered into a sinusoidal wave with few harmonic components by the moving average method can be supported by the Faraday's law. Since a temporal derivative of an interlinkage magnetic flux becomes a voltage according to the Faraday's law, a temporal integration of the voltage becomes an interlinkage magnetic flux conversely. Thus, a change can be made to a pseudo-sinusoidal wave of the magnetic flux by rendering a change in magnetic flux that gives the interlinkage magnetic flux into a PWM pulse width. For example, a relationship between an induced electromotive force (e) and an interlinkage magnetic flux (Ψ) is shown as Equation (A) below according to the Faraday's law. In other words, integration of the induced electromotive force (e) enables the interlinkage magnetic flux (Ψ') in the rotating electric machine to be evaluated as shown in Equation (B) below.

[Expression 3]

$$e = -\frac{d\Psi}{dt} \tag{A}$$

[Expression 4]

$$\Psi = -\int e dt \cong \sum_{i=t-N\delta}^{t-\delta} e(i)\delta \tag{B}$$

On the other hand, a moving average value Av of the voltage [v] output every time duration [δ] in a time period tracing back N (a positive integer) steps from a discrete time point [t], that is, [t−Nδ to t−δ], is a value obtained by integrating the voltage [v] every time duration [δ] and dividing the obtained value by N according to Expression (1) above. Thus, the obtained moving average value Av is, as a result, equivalent to a value obtained by dividing the interlinkage magnetic flux (Ψ) obtained by the aforementioned Expression (B) by Nδ. In other words, the moving average value Av of the voltage obtained in the voltage control device and the like of the present embodiment is equivalent to a moving average value of the interlinkage magnetic flux (Ψ) produced by the induced electromotive force (e) in the rotating electric machine.

As described, by comparing the moving average value of the predetermined voltage [v] and an instantaneous value of the modulation wave which is the sinusoidal wave by the moving average method and on the basis of a result of the comparison, controlling the output voltage by turning on/off the switching element by the control pulse, the moving average of the voltage to be output can be arranged, and as a result, oscillation (fluctuation) of the magnetic flux amount in the rotating electric machine or the like can be smoothed by the averaging operation, and the spatial distribution of the magnetic flux in the rotating electric machine or the like can be rendered into a sinusoidal wave with few harmonic components. In other words, the operation called the moving average of the voltage [v] output every time duration [δ] in the voltage control device and the like of the present embodiment corresponds to smoothing the oscillation of the magnetic flux amount by the averaging operation.

Since the magnetic flux in the rotating electric machine or the like bears the essence of electromechanical energy conversion as described above, the voltage control device and the like of the present embodiment enable a primary current and torque ripple to be reduced and even a striking current to be reduced by rendering the spatial distribution of the magnetic flux in the rotating electric machine or the like into the sinusoidal wave with few harmonic components.

[Voltage Control Device]

Hereinafter, an example of the voltage control device of the present embodiment will be described with reference to FIG. 3. FIG. 3 is a diagram showing an example of an overall configuration including the voltage control device according to the present embodiment. In FIG. 3, a system 100 is an example including an alternating-current electric motor as a load and is configured to include an inverter 20, a motor 30, and a direct-current (DC) power source 40. The inverter 20 includes a voltage control device 10.

The voltage control device 10 includes a modulation wave generation unit 12, an arithmetic unit 14, and a control pulse generation unit 16 and controls turning on/off of switching elements 22A to 22C and switching elements 24A to 24C of the inverter 20 by control pulses.

The modulation wave generation unit 12 generates a sinusoidal wave based on a driving voltage and a driving frequency as a modulation wave. The modulation wave generation unit 12 may generate the modulation wave based on the driving voltage and the driving frequency when the system 100 is driven, or may generate the modulation wave in accordance with the driving voltage and the driving frequency when a control pulse is output.

The arithmetic unit 14 calculates, at the discrete time point [t], a moving average value of the voltage [v] output every time duration [δ] smaller than a time cycle of the modulation wave described above in a time period [t−Nδ to t−δ] tracing back N (a positive integer) steps from the discrete time point [t] in accordance with Expression (1) below. The moving average value of the voltage [v] at the discrete time point [t] is hereinafter referred to as a "moving average value Av(t)" in some cases.

[Expression 5]

$$\sum_{i=1}^{N} \frac{v(t-i\delta)}{N} \tag{1}$$

The voltage control device 10 outputs a control pulse to the inverter 20 every 0.1 msec, for example. Any discrete time point [t] is not particularly limited, and preferably is an integral multiple of the time duration [δ] and is equivalent to a time point at which the control pulse is transmitted. The arithmetic unit 14 calculates the moving average value every time duration [δ] in accordance with Expression (1).

The control pulse generation unit 16 generates a control pulse in accordance with a result of a comparison between the moving average value calculated by the arithmetic unit and the instantaneous value of the modulation wave at the discrete time point [t]. The instantaneous value of the modulation wave at the discrete time point [t] is a voltage of the sinusoidal wave generated by the modulation wave generation unit 12 as the modulation wave at the discrete time point [t] (the instantaneous value of the modulation wave at the discrete time point [t] will be hereinafter referred to as an "instantaneous value S(t)" in some cases).

The control pulse generation unit 16 generates a control pulse of outputting "0" in a case where the moving average value Av(t) is positive and larger than the instantaneous value S(t) of the modulation wave, a positive pulse voltage [$+V_0$] in a case where the moving average value Av(t) is positive and smaller than the instantaneous value S(t) of the modulation wave, a negative pulse voltage [$-V_0$] in a case where the moving average value Av(t) is negative and larger than the instantaneous value S(t) of the modulation wave, or the voltage of 0 in a case where the moving average value Av(t) is negative and smaller than the instantaneous value S(t) of the modulation wave as shown in the following table, for example. Note that the positive pulse voltage [$+V_0$] and the negative pulse voltage [$-V_0$] are direct-current voltages determined by the inverter 20 and the direct-current power source 40 and are used for driving the motor 30.

TABLE 1

| | Av(t) > 0 | Av(t) < 0 |
|---|---|---|
| Av(t) > S(t) | 0 | $-V_0$ |
| Av(t) < S(t) | $+V_0$ | 0 |

The voltage control device 10 can be configured by a control circuit including a CPU (central processing unit) 17, an interface (I/F) 18, and a memory 19 and can be configured using, as a base, an application specific circuit such as an ASIC (application specific integrated circuit). The CPU 17 is not particularly limited and plays the roles of the modulation wave generation unit 12, the arithmetic unit 14, and the control pulse generation unit 16. The interface 18 outputs a pulse signal for controlling each of the switching elements 22A to 22C and 24A to 24C of the inverter 20 in accordance with a control signal transmitted from the CPU 17. The memory 19 includes a ROM (Read Only Memory) and a RAM (Random Access Memory) that play the roles of main recording units, a volatile or non-volatile memory as an auxiliary recording unit, and the like. The modulation wave generated by the modulation wave generation unit 12, each voltage [v] output every time duration [δ], and the like can be stored in the memory 19.

A method for calculating the moving average value of the voltage [v] output every time duration [δ] in the present embodiment will be described with reference to FIG. 4. FIG. 4 is an outline diagram for describing the moving average value Av(t) in the present embodiment. As described above, the arithmetic unit 14 calculates the moving average value Av(t) at the current time (the discrete time point [t]) for transmitting a control pulse. The moving average value Av(t) is a value obtained by integrating the voltages [v] output every time duration [δ] in the time period [t−Nδ to t−δ] tracing back predetermined N steps from the discrete time point [t] and dividing the integrated value by N.

As shown in FIG. 4, in a case where it is set that N=6 holds, for example, the voltages [v] from a time duration δ1 to a time duration δ6 are integrated. In FIG. 4, the voltages [v] are output six times in the N steps. Specifically, a positive voltage [$+V_0$] is output four times in total in the time durations δ1, δ3, δ4, and δ6 and a negative voltage [$-V_0$] is output once in the time duration δ5. As shown in FIG. 4, the output voltage is "0" in the time duration δ2. In a case where each of the time durations [δ] is 0.1 msec and $|V_0|$ is 300 V, for example, the moving average value Av(t) becomes (300×4−300×1+0×1)/6=150 (V).

The control pulse generation unit 16 specifies the instantaneous value S(t) of the modulation wave at the discrete time point [t] on the basis of the sinusoidal wave generated as the modulation wave by the modulation wave generation unit 12 and compares the instantaneous value S(t) with the moving average value Av(t). In a case where the moving average value Av(t) is 150 V (that is, the moving average value Av(t)>0 holds) as described above, the control pulse generation unit 16 renders the output voltage into "0" at the discrete time point [t] if the instantaneous value S(t) is larger than 150 V, for example. On the other hand, the control pulse generation unit 16 renders the output voltage into "$+V_0$" at the discrete time point [t] if the instantaneous value S(t) is smaller than 150 V. In a case where the moving average value Av(t) is smaller than 0 (for example, −150 V) and if the instantaneous value S(t) is larger than −150 V, for example, the control pulse generation unit 16 renders the output voltage into "$+V_0$" at the discrete time point [t], and if the instantaneous value S(t) is smaller than −150 V, the control pulse generation unit 16 renders the output voltage into "0" at the discrete time point [t]. Note that there is no particular limitation in a case where the moving average value Av(t) =the instantaneous value S(t) holds or in a case where the moving average value Av(t)=0 holds and, for example, the control pulse generation unit 16 can render the output voltage into "0" at the discrete time point [t]. However, the present embodiment is not limited to the aspect, and the output voltage is based on "0" and may be controlled to be $+V_0$ or $-V_0$ in accordance with a tendency of the voltage waveform (such as whether the voltage is on a rising tendency or on a falling tendency, for example) in a time period before the time point t, for example.

In the voltage control device and the like of the present embodiment, the time duration [δ] can be set without a particular limitation as long as it is a time duration sufficiently smaller than the time cycle of the modulation wave (20 msec in a case where the driving frequency is 50 Hz, for example), and from the viewpoint of sampling theorem, can be set at 0.001 msec to 10 msec, for example, and preferably can be set at 0.01 msec to 0.1 msec. The N number (integer) of the N steps for determining the moving average value of the voltage [v] can be set at 100 to 10000, for example, from the viewpoint of smoothing and preferably can be set at 2 to 100.

A time period (interval) in which the voltage control device 10 outputs the control pulse to the inverter 20 is not particularly limited. As the time period (interval) is shorter, a finer waveform with fewer harmonic components can be obtained, whereas the number of times of switching of a semiconductor switch may increase, resulting in an increase in switching loss. Considering such a viewpoint, the time period (interval) in which the voltage control device 10 outputs the control pulse to the inverter 20 can be set at 0.001 msec to 10 msec, for example, and preferably can be set at 0.01 msec to 0.1 msec.

Note that in the present embodiment, the time duration [δ] is a constant numeric value (time period) throughout the processing, and $|V_0|$ applied to the motor 30 has a constant value. However, the present invention is not limited to this, and, for example, may be configured such that $|V_0|$ to be applied varies on the basis of the result of the comparison between the moving average value and the instantaneous value, or detailed control may be performed considering the duty ratio.

The inverter 20 is a PWM control inverter configured to include switching elements and converts direct-current power into a variable voltage, variable frequency, three-phase alternating-current voltage on the basis of the control pulse output from the voltage control device 10 so as to drive the motor 30 which is an alternating-current rotating electric machine by the direct-current power source 40 that supplies a direct-current voltage. The inverter 20 includes the switching elements 22A to 22C and the switching elements 24A to 24C, and turning on/off of each of the switching elements is controlled on the basis of the control pulse output from the voltage control device 10. The inverter 20 is connected such that the driving voltage can be applied to each stator winding of the motor 30 and applies a three-phase alternating-current voltage obtained by conversion to a stator of the motor 30 as the driving voltage. The switching elements 22A to 22C and the switching elements 24A to 24C are not particularly limited, and an IGBT (Insulated Gate Bipolar Transistor) or the like which is one of power semiconductors, for example, can be employed. In the present embodiment, a freewheeling diode is provided in parallel to each of the switching elements, and it is designed such that a back electromotive force produced in a case where the switching elements are turned off is flown back to the direct-current power source 40 side.

The motor 30 is an alternating-current three-phase tetrapolar electric motor and has a rotor rotated when a three-phase alternating current voltage is applied to the stator. The motor 30 is not particularly limited, and from the viewpoint of sufficiently exercising the effects of reducing a primary current and torque ripple and reducing a striking current exerted by the voltage control device and the like of the present embodiment, a rotary machine to be driven with high efficiency, for example, can be suitably used. Examples of such a rotary machine can include a superconducting rotary machine described in International Publication No. WO 2009/116219, for example, which enables induction rotation and synchronous rotation, which is excellent in heat dissipation, and which facilitates magnetic flux trapping for synchronous rotation.

As described above, the voltage control device of the present embodiment is a voltage control device that controls the output voltage by turning on/off the switching elements by the control pulse, including a modulation wave generation unit that generates a sinusoidal wave based on a driving voltage and a driving frequency as a modulation wave, an arithmetic unit that calculates, at any discrete time point [t], a moving average value of the voltage [v] output every time duration [δ] smaller than the time cycle of the modulation wave in a time period [t−Nδ to t−δ] tracing back N (a positive integer) steps from the discrete time point [t] in accordance with Expression (1) described above, and a control pulse generation unit that generates the control pulse in accordance with a result of a comparison between the moving average value and the instantaneous value of the modulation wave at the discrete time point [t]. Thus, when controlling the alternating-current rotating electric machine, smoothing of the magnetic flux amount in the rotating electric machine can be performed. The voltage control device of the present embodiment can thereby reduce a primary current, torque ripple, and a striking current of the rotating electric machine or the like.

[Voltage Control Method]

Hereinafter, a flow of the voltage control method of the present embodiment which is the voltage control method for controlling an output voltage by turning on/off a switching element by a control pulse, including generating a sinusoidal wave based on a driving voltage and a driving frequency as a modulation wave, calculating, at any discrete time point [t], a moving average value of the voltage [v] output every time duration [δ] smaller than the time cycle of the modulation wave in the time period [t−Nδ to t−δ] tracing back N (a positive integer) steps from the discrete time point [t] in accordance with Expression (1) described above, and generating the control pulse in accordance with a result of a comparison between the moving average value and the instantaneous value of the modulation wave at the discrete time point [t] will be described. FIG. 5 is a flowchart showing the flow of the voltage control method of the present embodiment.

First, the system 100 generates the modulation wave in the modulation wave generation unit 12 so as to generate the control pulse for controlling a switching element of the inverter 20 at any discrete time point [t]. The modulation wave generation unit 12 generates a sinusoidal wave on the basis of the driving voltage and the driving frequency for storage in the memory 19 (step S1). In the present embodiment, the instantaneous value S(t) of the modulation wave at the discrete time point [t] is specified and stored in the memory 19 in step S1. Note that in the second and subsequent processes, it is not necessary to newly generate the modulation wave in step S1, and the instantaneous value S(t) can be specified on the basis of the sinusoidal wave (modulation wave) stored in the memory 19.

Then, the system 100 calculates in the arithmetic unit 14 the moving average value Av(t) of the voltage [v] output every time duration [δ] in the time period [t−Nδ to t−δ] tracing back N (a positive integer) steps from the discrete time point [t] in accordance with Expression (1) described above (step S2). Subsequently, the system 100 compares the moving average value Av(t) and the instantaneous value S(t) of the modulation wave in the control pulse generation unit 16 (step S3). The control pulse generation unit 16 first compares the moving average value Av(t) and the instantaneous value S(t) in magnitude (step S4), and in a case where the moving average value Av(t) is larger than the instantaneous value S(t) (YES in step S4), the process proceeds into step S5.

In step S5, the control pulse generation unit 16 determines whether or not the moving average value Av(t) is larger than 0, and in a case where the moving average value Av(t) is smaller than 0 (NO in step S5), the process proceeds into step S7, where a control pulse that renders the voltage into "$-V_0$" is generated, and the voltage control device 10 outputs a control pulse signal to the inverter 20.

In step S5, in a case where the moving average value Av(t) is larger than 0 (YES in step S5), the process proceeds into step S8, where a control pulse that renders the voltage into "0" is generated, and the voltage control device 10 outputs a control pulse signal to the inverter 20.

On the other hand, in step S4, in a case where the moving average value Av(t) is smaller than the instantaneous value S(t) (NO in step S4), the process transitions to step S6, where the control pulse generation unit 16 determines whether or not the moving average value Av(t) is larger than 0. In step S6, in a case where the moving average value Av(t) is larger than 0 (YES in step S5), the process proceeds into step S9, where a control pulse that renders the voltage into "$+V_0$" is generated, and the voltage control device 10 outputs a control pulse signal to the inverter 20.

In step S6, in a case where the moving average value Av(t) is smaller than 0 (NO in step S6), the process proceeds into step S8, where a control pulse that renders the voltage into "0" is generated, and the voltage control device 10 outputs a control pulse signal to the inverter 20.

When the control pulse signals generated in respective steps S7 to S9 are input to the inverter 20, turning on/off of the switching elements is controlled in accordance with these signals. A voltage in accordance with each PWM signal is applied to the motor 30, and processing at any discrete time point [t] is finished.

Note that the present embodiment is configured such that the moving average value Av(t) and the instantaneous value S(t) of the adjustment wave is compared in magnitude in step S4, and then it is determined whether or not the moving average value Av(t) is larger than 0 in step S5 and step S6. However, the present invention is not limited to the aspect, and it may be configured such that the moving average value Av(t) and the instantaneous value S(t) of the adjustment wave may be compared in magnitude after it is determined whether or not the moving average value Av(t) is larger than 0, and a control pulse signal is generated in accordance with a result of the comparison. Although the magnitudes of the moving average value Av(t) and the instantaneous value S(t) of the modulation wave and whether or not the moving average value Av(t) is larger than 0 are determined in the present embodiment, the present invention is not limited to this, and the moving average value Av(t) may be compared with a numeric value other than 0 or a numeric value range, or a difference between the moving average value Av(t) and the instantaneous value S(t) of the modulation wave may be targeted for comparison, for example.

Effects

With the system 100 configured as described above, smoothing of the magnetic flux amount in the rotating electric machine can be performed when controlling the alternating-current rotating electric machine. The voltage control device and the like of the present embodiment can thereby reduce a primary current, torque ripple, and a striking current of the rotating electric machine or the like.

The voltage control device 10 configured as described above is applicable to a device using a magnetic flux produced by application of an alternating-current voltage, such as a high-frequency transformer or an electrolysis device such as MEMS, besides the rotating electric machine such as a motor. The system 100 is widely applicable to applications in which a rotary machine is used, such as motor vehicles (compact cars, mid-sized motor vehicles, large motor vehicles such as buses and trucks), railroads, submarines, aircrafts, vessels, and fluid circulating transfer pump applications, and, for example, can be applied to a superconducting electric motor system described in International Publication No. WO 2009/116219, and the like.

For a validity of the voltage control device and the voltage control method according to the present disclosure, driving simulation results (MATLAB®/Simulink® of The MathWorks, Inc. of a three-phase squirrel-cage induction motor carried out under the following conditions are shown below.

(Conditions)

Inverter: use an inverter including IGBT/diode

Switching time period: 0 (ideal)

Motor: three-phase squirrel-cage

Rated output: 2.238 kW

Rated voltage: 220 V
Rated frequency: 60 Hz
The number of poles: 4
Load torque: 7 Nm
Driving frequency: 50 Hz
Driving voltage: 200 V (effective value)
Output: 1.1 kW
Moving average denominator [N] (the number of steps: N=12)
Interval [δ] at which moving average is taken: 0.1 msec First, as shown in FIG. 1 and FIG. 2 described above, a comparison between a line voltage waveform in a case where a three-phase squirrel-cage induction motor is driven by a general PWM modulation method obtained on the basis of the above conditions and a line voltage waveform in a case where the three-phase squirrel-cage induction motor is driven by the voltage control method in the moving average method in the present embodiment reveals that a PWM waveform in the case of the voltage control method in the moving average method in the present embodiment in FIG. 2 is slightly collapsed as compared with the PWM waveform in the general PWM modulation method in FIG. 1.

Similarly, FIG. 6 and FIG. 7 show a line waveform frequency spectrum analysis diagram in a case where a three-phase squirrel-cage induction motor is driven by the conventional PWM method (a pseudo-sinusoidal wave output method: 1 kHz carrier) and a line waveform frequency spectrum analysis diagram in a case where the three-phase squirrel-cage induction motor is driven by the voltage control method in the moving average method in the present embodiment. As is understood from a comparison between FIG. 6 and FIG. 7, a comparison between the line voltage waveform in the case where the three-phase squirrel-cage induction motor is driven by the general PWM modulation method and the line waveform frequency spectrum analysis diagram in the case where the three-phase squirrel-cage induction motor is driven by the voltage control method in the moving average method in the present embodiment reveals that the line waveform frequency spectrum analysis diagram in the general PWM modulation method in FIG. 6 and the line waveform frequency spectrum in the case of the voltage control method in the moving average method in the present embodiment in FIG. 7 present totally different waveforms.

Next, for motor properties during driving in the conventional PWM method (the pseudo-sinusoidal wave output method: 1 kHz carrier) and motor properties during driving in the moving average method in the present embodiment, simulation results of a rotor speed (unit: Hz), a stator current Is (unit: A), a rotor current Ir (unit: A), and an electromagnetic torque Te (unit: N·m) on the basis of the above-described conditions are shown in FIG. 8 and FIG. 9.

As shown in FIG. 8, in the case where the three-phase squirrel-cage induction motor is driven by the general PWM modulation method, it is understood that the striking current reaches about 43 A at maximum and even after reaching a stationary state (after an elapse of about 0.5 seconds), oscillation is left in waveforms of the electromagnetic torque Te and the stator current Is.

In contrast, as shown in FIG. 9, in the case where the three-phase squirrel-cage induction motor is driven by the voltage control method in the moving average method in the present embodiment, the maximum striking current is kept under control at approximately 36 A, which is considerably lower than in the case of the general PWM modulation method (about 43 A), and it is presumed that the loss is low and an influence of overcurrent to be imposed on the inverter is small. Moreover, the waveform of the stator current Is after reaching the stationary state (after an elapse of about 0.5 seconds) has almost no distortion, and the waveform of the electromagnetic torque Te has almost no ripple. This is considered because smoothing of the magnetic flux which plays the leading role of electromechanical energy conversion has been achieved by the operation called the moving average although the PWM waveform of the voltage is collapsed at a glance as described above. The fact that the spatial distribution of the magnetic flux has a sinusoidal wave with few harmonic components because of the voltage control method in the moving average method in the present embodiment can be confirmed by the fact that the waveform of the stator current Is in FIG. 9 is a sinusoidal wave with fewer harmonic components than in FIG. 8. Furthermore, the stator current has a sinusoidal wave with few harmonic components (the spatial distribution of the magnetic flux has a sinusoidal wave with few harmonic components), as a result of which it is presumed that the rotor current Ir, the electromagnetic torque Te, and the rotation speed are stable.

Although various embodiments of the present invention have been described above, the present invention is not limited to the above-described embodiments. The present invention can be modified without departing from the spirit of the present invention.

For example, in the present embodiment, an aspect targeted for a two-level inverter that changes the output voltage to only two values of 0 or $|V_0|$ in accordance with a moving average value has been described as an aspect of the present invention, but the present invention is not limited to the embodiment. For example, a three-level (for example, the output voltage may assume 0, $|V_0/2|$, and $|V_0|$) or higher-level inverter can also be targeted.

Furthermore, in the present embodiment, smoothing of the magnetic flux has been described as an aspect of the present invention using, as an example, an aspect of employing the PWM method of generating a PWM pulse that outputs a predetermined voltage depending on a moving average value in accordance with a temporal axis, but the present invention is not limited to the embodiment, and a PAM method of changing a voltage amount depending on a moving average value or a PDM method of changing a pulse density can also be targeted.

REFERENCE SIGNS LIST

10: voltage control device, 12: modulation wave generation unit, 14: arithmetic unit, 16: control pulse generation unit, 17: CPU, 18: interface, 19: memory, 20: inverter, 22A, 22B, 22C, 24A, 24B, 24C: switching element, 30: motor, 40: direct-current power source, 100: system

The invention claimed is:

1. A voltage control device that controls an output voltage by turning on/off a switching element by a control pulse, the voltage control device comprising:

a modulation wave generation unit that generates a sinusoidal wave based on a driving voltage and a driving frequency as a modulation wave;

an arithmetic unit that calculates, at any discrete time point [t], a moving average value of a voltage [v] output every time duration [δ] smaller than a time cycle of the modulation wave in a time period [t-Nδ to t-δ] tracing back N (a positive integer) steps from the discrete time point [t] in accordance with Expression (1) below; and a control pulse generation unit that generates the control pulse in accordance with a result of a comparison between the moving average value and an instantaneous value of the modulation wave at the discrete time point [t]:

[Expression 1]

$$\sum_{i=1}^{N} \frac{v(t - i\delta)}{N} \quad (1)$$

2. The voltage control device according to claim 1, wherein the control pulse generation unit generates a control pulse of outputting 0 in a case where the moving average value is positive and larger than the instantaneous value of the modulation wave, a positive pulse voltage [$+V_0$] in a case where the moving average value is positive and smaller than the instantaneous value of the modulation wave, a negative pulse voltage [$-V_0$] in a case where the moving average value is negative and larger than the instantaneous value of the modulation wave, or a voltage of 0 in a case where the moving average value is negative and smaller than the instantaneous value of the modulation wave.

3. A rotating electric machine comprising the voltage control device according to claim 2.

4. A vessel comprising the voltage control device according to claim 2.

5. A motor vehicle comprising the voltage control device according to claim 2.

6. An aircraft comprising the voltage control device according to claim 2.

7. A rotating electric machine comprising the voltage control device according to claim 1.

8. A vessel comprising the voltage control device according to claim 1.

9. A motor vehicle comprising the voltage control device according to claim 1.

10. An aircraft comprising the voltage control device according to claim 1.

11. A voltage control method for controlling an output voltage by turning on/off a switching element by a control pulse, the voltage control method comprising:

generating a sinusoidal wave based on a driving voltage and a driving frequency as a modulation wave;

calculating, at any discrete time point [t], a moving average value of a voltage [v] output every time duration [δ] smaller than a time cycle of the modulation wave in a time period [t-Nδ to t-δ] tracing back N (a positive integer) steps from the discrete time point [t] in accordance with Expression (1) below; and generating the control pulse in accordance with a result of a comparison between the moving average value and an instantaneous value of the modulation wave at the discrete time point [t]:

[Expression 2]

$$\sum_{i=1}^{N} \frac{v(t - i\delta)}{N} \quad (1)$$

12. The voltage control method according to claim 11, comprising generating a control pulse of outputting 0 in a case where the moving average value is positive and larger than the instantaneous value of the modulation wave, a positive pulse voltage [$+V_0$] in a case where the moving average value is positive and smaller than the instantaneous value of the modulation wave, a negative pulse voltage [$-V_0$] in a case where the moving average value is negative and larger than the instantaneous value of the modulation wave, or a voltage of 0 in a case where the moving average value is negative and smaller than the instantaneous value of the modulation wave.

* * * * *